Feb. 10, 1948.  F. C. BOYD ET AL  2,435,868
DRILL PIPE PROTECTOR APPLICATOR
Filed March 9, 1940
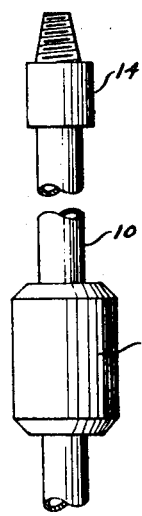
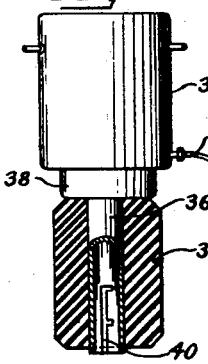
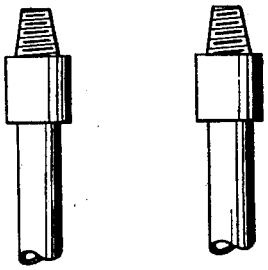
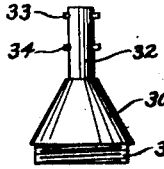
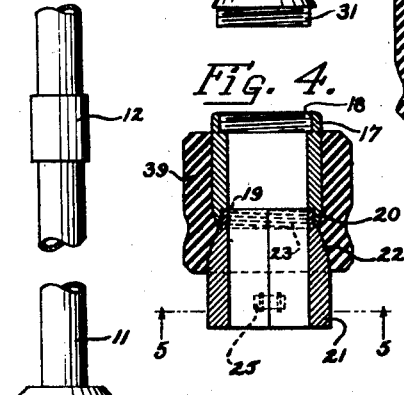
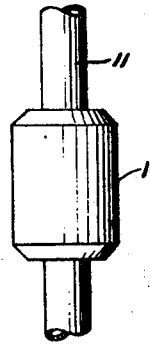
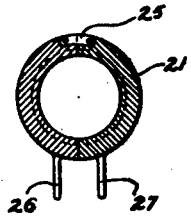
INVENTORS
Frank C. Boyd, Harry L. Hester,
and Paul A. Medearis
BY
Lyle Dillon
ATTORNEY Patented Feb. 10, 1948

2,435,868

UNITED STATES PATENT OFFICE 2,435,868

DRILL PIPE PROTECTOR APPLICATOR

Frank C. Boyd, Santa Fe Springs, Harry E. Hester, Los Angeles, and Paul A. Medearis, Southgate, Calif.

Application March 9, 1940, Serial No. 323,096

9 Claims. (Cl. 29—236)

This invention relates generally to an apparatus for applying annular shaped elastic protectors to tubular goods and particularly the installation of rubber protectors upon drill pipe such as that employed for drilling oil wells. The elastic protectors employed in connection with the present invention are adapted to encircle and grip tightly the drill pipe to which they are applied and to form cylindrically shaped buffers which are of sufficient external diameter to absorb impact and to reduce frictional contact between the rotating drill pipe and the casing and surrounding formation through which drilling operations are carried on.

The employment of rubber protectors around pipes used for drilling wells has been extensively adopted. Such protectors are usually composed of live rubber and have external diameters substantially greater than the tool joints and couplings of the pipe upon which they are installed and internal diameters normally substantially less than the outside diameter of the pipe to which they are to be applied. That the internal diameter of the rubber protectors be substantially less than the outside diameter of the pipes to which they are to be applied is desirable in order to insure that the protectors when applied will grip the pipe firmly and remain permanently in the desired position upon the pipe as applied without slipping or relative rotation.

Drill pipe which is employed for drilling oil wells is usually transported to the well and horizontally racked in made-up lengths of approximately forty feet, known as "doubles." The double is ordinarily made up of two twenty foot lengths of drill pipe joined end to end by means of a pipe coupling and terminated at one end in a tool joint box and at the other end by a tool joint pin. As is well known to those familiar with drilling operations these tool joints have external diameters which are considerably greater than the drill pipe which carries them and in applying rubber protectors it is, therefore, necessary to expand them by suitable means to internal diameters great enough to enable them to pass over the pipe but also over the tool joints and couplings. It is obvious that in order to accomplish such necessary extensive expansion of these rubber protectors, suitable apparatus, capable of applying forces to them which are much greater than those which it is possible to apply manually, is required.

Prior to this invention reliance was placed upon mechanical means for applying the rubber protectors such as, for example, that illustrated in the Bettis Patent No. 1,965,876 by means of which the rubber protectors were forced on to the end of the drill pipe over a tapered mandrel which made threaded connection with the tool joint pin. Sufficient longitudinal force was usually applied to the rubber protector to force it over the tapered mandrel and tool joint and onto the drill pipe by lowering the previously up-ended pipe carrying the tapered mandrel at the lower end through the rubber protector which was supported upon a number of expansible jaws which gripped and supported the lower edge of the said rubber protector. The apparatus was thus dependent upon the weight of the elevated drill pipe for its operation.

The principal disadvantages of the before described method and other similar commonly employed methods of applying the rubber protectors resides in the necessity of hoisting the drill pipe into an up-ended position and since it is usually desirable to apply the protectors to the drill pipe at the site of the drilling well this method, therefore, necessitated the utilization of the well derrick hoisting equipment for this purpose with resultant interruption of drilling operations. Another serious disadvantage of such commonly employed methods of applying protectors is that it is obviously necessary to force the tightly fitting protectors along the length of the drill pipe and over collars to the points where it is desired to position them permanently with the result that the inside surfaces of the rubber protectors applied in this manner are damaged by abrasion and the whole protector is usually left in final position upon the pipe in a more or less permanently deformed shape which persists throughout the drilling operations. These methods heretofore employed for applying protectors were thus damaging to the protectors and consumed valuable well drilling time at the drilling rig.

The object of this invention is to provide an apparatus for applying rubber protectors to drill pipe which will obviate the hereinbefore described disadvantages by enabling protectors to be applied at any desired position upon the drill pipe without the necessity of forcing the said protectors along the length of the pipe to the position desired.

It is another object of this invention to provide means by which rubber protectors can be readily and rapidly applied to drill pipe at the drilling well site, in any desired number, while such drill pipe is in place upon the drill pipe rack and without the necessity of hoisting the pipe doubles from the rack to an up-ended position with the attendant loss of drilling time.

The invention accordingly resides in a tool adapted to receive and retain a rubber protector in an expanded condition and by means of which the protector can be transported in such expanded condition to any desired position along the length of the drill pipe to which the protector is to be applied and released at will upon the drill pipe at any such position.

Other objects and features of novelty will be evident hereinafter.

In the drawings which illustrate a preferred embodiment of the invention Figure 1 illustrates a fragmentary view of a drill pipe double with rubber protectors in place. Figure 2 illustrates an hydraulically operated expander tool for placing the protector upon the applicator tool. Figure 3 illustrates a tapered mandrel for expanding the rubber protector into place upon the applicator tool. Figure 4 is a longitudinal section of the protector applicator tool carrying a rubber protector in place in operative position. Figure 5 is a cross sectional view taken at line 5—5 of Figure 4. Figure 6 is a longitudinal sectional view of the applicator in place upon the drill pipe at the instant of release of the protector. Figure 7 illustrates a longitudinal sectional view of the applicator of Figure 6 but with the rubber protector in the initial stage of application to the drill pipe and Figure 8 illustrates a sectional view of the disengaged applicator with the applied rubber protector in place upon the drill pipe.

Corresponding elements in the several figures are designated by the same reference numerals.

The apparatus is as follows: Referring to Figure 1, a typical double of drill pipe is shown by way of illustration in fragmentary view, comprising two lengths of drill pipe 10 and 11 joined end to end by means of a pipe coupling 12 and carrying at one end a tool joint box 13 and at the other end a tool joint pin 14. Rubber protectors 15 and 16 are shown in place upon the drill pipe double and these rubber protectors 15 and 16 may be placed at any desired position upon the drill pipe intermediate the tool joints and couplings.

Referring to Figure 4, 17 is a solid cylindrical metal sleeve having an internal diameter slightly greater than the external diameter of the largest tool joint or coupling on the drill pipe to which it is to apply rubber protectors. The said cylindrical sleeve 17 is provided with internal threads at each end, as shown at 18 and 19. A split sleeve 21 having an external taper to a smaller diameter at one end, as shown at 22, is provided with external threads 23 which are adapted to make threaded connection with the internal threads 19 at the adjacent end of the cylindrical sleeve 17 which also is externally tapered at 20. The split sleeve 21 is provided with a double ended hinge 25 at one side by means of which it may be opened and applied to or removed from drill pipe as desired and handles 26 and 27 are provided on the opposite sections of the split sleeve to facilitate such operation.

In Figure 3, 30 is a tapered mandrel provided with threads 31 at the end of largest diameter, which threads are adapted to make connection at 18 with the end of the cylindrical sleeve 17 which is opposite to that of the split sleeve 21. The tapered mandrel 30 is provided at the end of smallest diameter with a cylindrical plug extension 32 carrying bayonet lugs, as shown at 33 and 34. In Figure 2, apparatus is illustrated which is not a part of this invention but which may be employed for forcing the rubber protectors over the tapered mandrel 30 and onto the applicator tool to the position shown in Figure 4. Said apparatus of Figure 2 comprises an hydraulic cylinder 35 from one end of which extends a hollow piston rod 36. The said piston rod 36 makes connection within the cylinder 35 with a piston, not shown, and the hydraulic connection 37 is provided for introducing a fluid, such as water or oil, under pressure into the cylinder. The piston rod 36 is adapted to retract into the cylinder 35 when hydraulic pressure is thus applied to the said cylinder at 37. A bumper 38, preferably composed of a resilient substance, such as rubber, is provided at the piston end of the cylinder 35 and surrounding the piston rod 36 for the purpose of transmitting pressure from the end of the hydraulic cylinder to the rubber protector which may be placed upon the piston rod 36, as shown at 39. The diameter of the piston rod 36 is such that it passes freely through the unexpanded rubber protector to be installed. The outer end of the piston rod 36 is tubular in form, as before stated, and is provided with a pair of J slots, one of which is shown at 40. The outer tubular end of the piston rod 36 is thus adapted to receive the lugs 33 and 34 into the J slots and thereby to make a bayonet connection with the plug 32 of the tapered mandrel 30.

The operation of the invention is as follows: Before applying a rubber protector to a length of drill pipe it is first necessary to place a rubber protector in an expanded condition upon the applicator tool which comprises the cylindrical sleeve 17 and the tapered split sleeve 21 which are connected together by means of threads 19 and 23, as shown in Figure 4. The method of application of the rubber protector to the applicator is as follows: The tapered mandrel 30 is threaded to the upper end of the cylindrical sleeve 17 by means of threads 18 and 31. A rubber protector is next placed upon the piston rod 36 while it is in an extended position, as shown at Figure 2 and the piston rod is then connected to the mandrel plug 32 by means of the bayonet joints as shown at 40. Fluid pressure is next applied to the connection 37 of the cylinder 35 which causes the piston rod 36 to retract into the cylinder 35. The result of the retraction of the piston rod 36 into the cylinder 35 is to force the rubber protector 39 downward, as viewed in Figure 2, over the tapered mandrel 30 and onto the applicator tool to a position chiefly upon the cylindrical sleeve 17 but extending onto the tapered sleeve 21 a relatively short distance, as shown in Figure 4. After the rubber protector has thus been placed upon the applicator tool in expanded condition the tapered mandrel may be disconnected and the applicator tool carrying the protector is then ready to be transported to any position upon the drill pipe at which it is desired to apply the protector.

After the applicator tool carrying the expanded rubber protector, as shown in Figure 4, has been placed over the drill pipe and moved to the point on the pipe at which the rubber protector is to be applied, it is released by unscrewing the split sleeve 21 from the cylindrical sleeve 17. The connection between the sleeves having thus been broken the pressure of the rubber protector forces them apart, as shown in Figure 6. The tapered sleeve 21 under the continued force of the rubber protector is instantly forced clear, as shown in Figure 7, thereby allowing one end of the rubber protector to contract and grip the drill pipe, as shown at 45. The cylindrical sleeve 17 under the compression of the remaining expanded portion of the protector is immediately thereafter forced outward and away from the protector leaving the said protector in position on the pipe, as shown in Figure 8. The split sleeve 21 may then be removed from the pipe by opening the hinge 25 and the cylindrical sleeve 17 may be removed over the tool joint at the end of the pipe.

The applicator tool sleeve surfaces may be coated with a suitable lubricant, such as soapy water or oil, prior to receiving the expanded protector, in order to facilitate both the placing of the protector upon the tool and its release therefrom upon the pipe, as hereinbefore described.

Advantages of this invention are that rubber protectors may be placed upon applicator tools by means of the hydraulic expander at any time during the drilling of the well without necessitating interruptions of the drilling operations and the applicator tool carrying the expanded rubber protector can be easily transported and placed over the drill pipe to which the protector is to be applied while the said drill pipe is in horizontal position on the pipe rack, it being only necessary to lift one end of the pipe a sufficient distance to allow the applicator tool to clear the rack. Rubber protectors may thus be placed upon the drill pipe doubles in any desired number prior to assembling the doubles into stands within the derrick, without in any way interrupting the drilling operations. The applicator tool also makes it possible to place the rubber protector at any point along the length of the drill pipe double or stand without friction between the protector and the drill pipe since the applicator tool is made with an internal diameter sufficiently great to clear all couplings and tool joints. The drill pipe protector is thus saved from damage usually caused by the common method of application where it is necessary to force the protector along the length of the pipe and over the couplings. Furthermore, when the rubber protector is released from the applicator tool upon the drill pipe, as described hereinbefore, it assumes a substantially perfect cylindrical shape thereon free from the more or less permanent deformations heretofore caused by methods of application which, as stated before, forced the protector along the length of the pipe.

The foregoing is illustrative of the preferred method and apparatus and the invention is not to be limited thereby but may include any method and apparatus for accomplishing the same within the scope of the following claims.

We claim:

1. Apparatus for installing annular elastic protectors upon pipe comprising a substantially cylindrical sleeve adapted to support and carry a substantial portion of an annular elastic protector in expanded condition, with a free end or unsupported portion of the protector having an inherent tendency to dislodge the protector from the sleeve, retaining means adapted to engage said free end or unsupported portion of said elastic protector to thereby retain said protector on the said first mentioned sleeve, and detachable means for coupling said retaining means and the cylindrical sleeve together, said retaining means being detachable so that it may be disconnected from said sleeve whereby to free the elastic protector under the force of its tension which acts to remove the same from said sleeve for disposition upon the pipe to which it is to be applied.

2. A device according to claim 1 wherein the sleeve has a portion of reduced diameter for engagement by a portion of the protector.

3. A device according to claim 1 wherein the retaining means receiving the extending protector end has a portion of reduced diameter to be engaged by said end.

4. Apparatus for installing annular elastic rubber protectors on drill pipe comprising an elongated cylindrical supporting sleeve member adapted to receive an elongated expanded elastic protector, the external diameter of the sleeve being greater than the internal diameter of the protector so that the expanded protector is held on the sleeve under substantial tension, and an annular releasing member carried on said sleeve coaxially therewith, said releasing member being movable axially of said sleeve for release of the protector from said sleeve, whereby, upon relative movement of the members, the elastic protector will be removed from said sleeve under the force of its own tension and disposed upon the drill pipe.

5. A device for installing annular elastic protectors on drill pipe comprising a sleeve member, a second sleeve member carried thereon, said second sleeve member having a tapered end overlapping said first mentioned sleeve member, and an elastic annular protector covering the overlapping portions of said sleeve members.

6. A device for installing annular elastic rubber protectors on drill pipe comprising an elongated cylindrical supporting sleeve member adapted to receive an elongated expanded rubber protector, the external diameter of the sleeve member being greater than the internal diameter of the protector so that the expanded protector is held on the sleeve under substantial tension, and an annular releasing member carried on said sleeve coaxially therewith, said releasing member being movable axially of said sleeve member for release of the protector from said sleeve; and an elastic rubber protector carried by said sleeve member and engaged by said annular member, whereby, upon relative movement of the members, the elastic rubber protector will be removed from said sleeve under the force of its own tension and disposed upon the drill pipe.

7. Apparatus for installing annular shaped elastic protectors upon pipe comprising a substantially cylindrically shaped sleeve adapted to carry an expanded annular shaped elastic protector in tension thereon with an end extending beyond said sleeve, a tapered sleeve adapted to engage and retain the extending end of the elastic annular protector from movement with respect to said sleeve, means for detachably joining the cylindrical sleeve and the tapered sleeve coaxially together to retain the protector thereon until the tapered sleeve is detached from the said cylindrical sleeve whereupon the elastic protector is released from said sleeves under the force of its tension and disposed upon the pipe to which it is to be applied.

8. Apparatus according to claim 7, in which the tapered sleeve is split longitudinally into two parts to facilitate removal from the pipe.

9. Apparatus for installing annular shaped elastic protectors upon pipe comprising a substantially cylindrically shaped sleeve adapted to carry an expanded annular shaped elastic protector in tension thereon with an end extending beyond said sleeve, a tapered sleeve adapted to engage and retain the extending end of the elastic annular protector from movement with respect to said sleeve, means for detachably joining the cylindrical sleeve and the tapered sleeve coaxially together to retain the protector thereon until the tapered sleeve is shifted relatively to the said cylindrical sleeve whereupon the elastic protector is released from said sleeves under the force of its tension and disposed upon the pipe to which it is to be applied.

FRANK C. BOYD.
HARRY E. HESTER.
PAUL A. MEDEARIS.

REFERENCES CITED

The following references are of record in the file of this patent:

UNITED STATES PATENTS

| Number | Name | Date |
|---|---|---|
| 46,464 | Grant | Feb. 21, 1865 |
| 1,395,140 | Reed | Oct. 25, 1941 |
| 1,420,509 | Waldron | June 20, 1922 |
| 1,552,645 | Powell | Sept. 8, 1925 |
| 1,830,814 | Thiry | Nov. 10, 1931 |
| 1,852,613 | Jessen | Apr. 5, 1932 |
| 1,913,933 | Lamborn | June 13, 1933 |
| 1,965,876 | Bettis | July 10, 1934 |
| 1,968,640 | Elms | July 31, 1934 |
| 2,038,840 | Hall | Apr. 28, 1936 |
| 2,086,371 | Tear | July 6, 1937 |
| 2,291,976 | Minor | Aug. 4, 1942 |
| 2,294,506 | Long | Sept. 1, 1942 |

FOREIGN PATENTS

| Number | Country | Date |
|---|---|---|
| 19,883 | Great Britain | Oct. 2, 1905 |
| 815,329 | France | Apr. 19, 1937 |